(12) United States Patent
Choi et al.

(10) Patent No.: US 11,104,805 B2
(45) Date of Patent: Aug. 31, 2021

(54) HIGH-SATURATION SCARLET COLOR DYE INK FOR HIGH-SPEED INKJET PROCESS

(71) Applicant: KOREA INSTITUE OF INDUSTRIAL TECHNOLOGY, Cheonan-si (KR)

(72) Inventors: Jun Choi, Seoul (KR); Sol Choi, Gunpo-si (KR); Kwan Hyun Cho, Suwon-si (KR); Eui Sang Yoo, Gunpo-si (KR)

(73) Assignee: KOREA INSTITUTE OF INDUSTRIAL TECHNOLOGY, Chungcheongnam-Do (KR)

( * ) Notice: Subject to any disclaimer, the term of this patent is extended or adjusted under 35 U.S.C. 154(b) by 277 days.

(21) Appl. No.: 16/395,238

(22) Filed: Apr. 26, 2019

(65) Prior Publication Data
US 2020/0109288 A1 Apr. 9, 2020

(30) Foreign Application Priority Data
Oct. 5, 2018 (KR) .................. 10-2018-0119144

(51) Int. Cl.
*C09D 11/00* (2014.01)
*C09B 5/62* (2006.01)
(Continued)

(52) U.S. Cl.
CPC .............. *C09B 5/62* (2013.01); *C09D 11/328* (2013.01); *D06P 1/908* (2013.01)

(58) Field of Classification Search
USPC ......... 106/31.01, 31.13, 31.27, 31.43, 31.46, 106/31.47
See application file for complete search history.

(56) References Cited

U.S. PATENT DOCUMENTS 3,006,882 A * 10/1961 Altermatt ................ C08L 77/00
524/90
3,842,084 A * 10/1974 Graser ...................... C09B 5/62
546/37
(Continued)

FOREIGN PATENT DOCUMENTS

KR  19960000173 A     1/1996
KR  2010/0093264 A  *  8/2010

OTHER PUBLICATIONS

English translation of KR 2010/0093264, Aug. 2010; 8 pages.*
(Continued)

*Primary Examiner* — James E McDonough
(74) *Attorney, Agent, or Firm* — Cantor Colburn LLP

(57) ABSTRACT

Highly saturated scarlet dye ink for a high-speed inkjet process and a method of preparing the highly saturated scarlet dye ink are disclosed. In particular, an ink composition according to the present invention includes a dye including a compound represented by Formula 1, and further includes, in addition to the dye, distilled water, a surfactant, and an additive. The ink composition develops a highly saturated scarlet color that is unable to be developed by existing inks for digital textile printing (DTP), and has high
(Continued)

water solubility, excellent heat resistance, and light-fastness, and thus may be effectively used as dye and ink for a high-speed inkjet process.

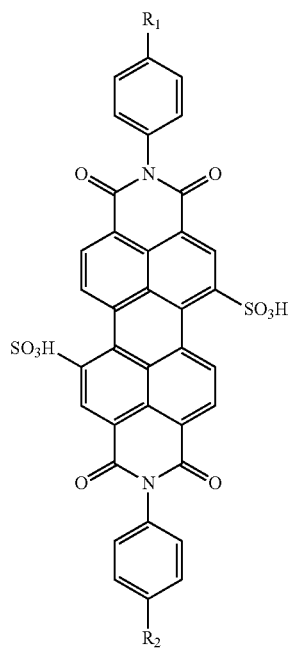

[Formula 1]

5 Claims, 14 Drawing Sheets
(8 of 14 Drawing Sheet(s) Filed in Color)

(51) Int. Cl.
*D06P 1/92* (2006.01)
*C09D 11/328* (2014.01)
*C09D 1/00* (2006.01)
*C09D 4/00* (2006.01)
*C09D 5/00* (2006.01)
*C09K 3/00* (2006.01)

(56) References Cited

U.S. PATENT DOCUMENTS

| | | | | |
|---|---|---|---|---|
| 4,141,881 A | * | 2/1979 | Babler | C08K 5/0041 |
| | | | | 524/90 |
| 4,709,029 A | * | 11/1987 | Spietschka | C09B 5/62 |
| | | | | 544/125 |
| 4,714,666 A | * | 12/1987 | Wiedemann | G03G 5/0659 |
| | | | | 430/59.1 |
| 5,330,865 A | * | 7/1994 | Leus | G03G 5/0657 |
| | | | | 430/58.45 |
| 6,184,378 B1 | * | 2/2001 | Bohm | C07C 65/15 |
| | | | | 546/37 |
| 6,916,928 B2 | * | 7/2005 | Becker | C07D 471/06 |
| | | | | 252/301.16 |
| 6,946,549 B2 | | 9/2005 | Ebenezer | |
| 2008/0223444 A1 | * | 9/2008 | Marder | C09K 11/06 |
| | | | | 136/263 |

OTHER PUBLICATIONS

Huang et al.; "Perylene-3,4,9,10-tetracarboxylic Acid Diimides: Synthesis, Physical Properties, and Use ink Organic Electronics", J. Org. Chem. 2011, 76, 8, 2386-2407, Mar. 16, 2011; 22 pages.*
Icil et al.; "Synthesis and Spectroscopic Properties of Highly Pure Perylene Fluorescent Dyes", Spectroscopy Letters, May 2001, vol. 34 Issue 3, p. 355-363; 11 pages.*
Kim et al.; The synthesis and application of thermally stable dyes for ink-jet printed LCD color filters:, Dyes and Pigments, vol. 81, Issue 1, Apr. 2009, p. 45-52; 8 pages.*
Choi et al.; "The synthesis and characterization of the perylene acid dye inks for digital textile printing", Dyes and Pigments 163 (2019) p. 381-392, available online Dec. 5, 2018; 12 pages.*
N,N-dimethylformamide from ChEBI; ebi.ac.uk/chebi/searchId.do? chebild-CHEBI:17741; no date available; 4 pages.*
N,N-dimethylformamide from PubChem; pubchem.ncbi.nlm.nih. gov/compound/N_N-Dimethylformamide; no date available; 78 pages.*
Kim et al.; "The Synthesis and Application of Thermally Stable Dyes for Ink-Jet printed LCD color Filters."; Dyes and Pigments, vol. 81, Issue 1, Apr. 2009, p. 45-52; 8 pages (Year: 2009).*

* cited by examiner

Acid red 27 ink

100μm

50μm 3b ink

100μm

50μm

HIGH-SATURATION SCARLET COLOR DYE INK FOR HIGH-SPEED INKJET PROCESS

BACKGROUND OF THE INVENTION

Field of the Invention

The present invention relates to highly saturated scarlet dye ink for a high-speed inkjet process and a method of preparing the ink, and more particularly, to highly saturated scarlet dye ink for a high-speed inkjet process, which is capable of having a high color expression power even with a small amount of dye due to high heat/light-fastness and high color intensity compared to azo- and anthraquinone-based dyes, which are currently mainly used as commercially available DTP dyes, and a method of preparing the ink.

Description of the Related Art

The dyeing industry is essential for the addition of value to textile products, but is a high-energy-consumption industry that requires the use of large amounts of auxiliary dye agents and water and high thermal energy consumption and is an industry indispensably requiring the construction of environmental pollution prevention facilities due to the generation of large amounts of wastewater and air pollution.

As the sustainability of the textile fashion industry has emerged as a global core issue, the global textile fashion market is promptly and actively responding to environmentally-friendly issues based on companies' demand. In addition, market competitiveness towards eco-friendly smart industries tends to be strengthened through cost innovation by smart factoring systems, development of eco-friendly processes, and linkage of front-back value chains.

Digital textile printing (DTP) is one of the most important systems in the dyeing processing field due to the possibility of both small-quantity production and mass-production of a variety of products, and production methods of dyed fiber through digital textile printing facilitate the production of customized products for customers in response to recent fashion trends, such as differentiation, individualization, and luxury.

Digital textile printing is divided into a transfer method and a direct injection method depending on the process method, and the direct injection method, which has slightly higher productivity than the transfer method, is a direct printing method performed on a material to be dyed by applying a piezo head injection method. Digital textile printing, which is a batch-processing system that performs all processes using a computer, enables remarkable simplification of processing processes as compared to existing textile printing methods and enables quick revision and datafication of design according to digitization of all processes.

Currently used inks for fiber DTP are readily soluble in water, have a wide color reproduction gamut and high color development, and have ink ejection stability, and thus water-soluble dyes are mainly used.

Inks for DTP require productivity, dispersion/dissolution stability, high heat/light-fastness, high color expression, and high dye adsorption rates, and especially require image display through stable ejection of a mixture of a colorant, a vehicle, and an additive onto the surfaces of media using an electric signal of a printer head without clogging the same.

However, dyes currently mainly used as DTP dyes have limitations in developing pale/deep colors and highly saturated colors, and have problems such as low productivity, low dispersion/dissolution stability, low heat/light-fastness, low color expression, low dye adsorption rates, and the like.

Therefore, to address these problems, the inventors of the present invention developed new dyes, and the newly developed dyes are acidic dyes with a scarlet color, which is a color other than the basic color composition of existing DTP (yellow, magenta, light magenta, cyan, light cyan, light black, black, orange, blue, and red), and enhances the color expression ability of products, thus addressing the disadvantages of DTP, which has limitations in developing pale/deep colors and highly saturated colors, compared to analog-type printing, in which dye mixing and application are relatively unrestricted.

In addition, the newly developed dyes are prepared by imparting high water solubility through modification of perylene, which is a parent pigment, and have high heat/light-fastness and high color intensity compared to existing DTP dyes, and thus may have a high color expression ability even when using a small amount of dye.

RELATED ART DOCUMENTS

Patent Documents (Patent Document 1) U.S. Pat. No. 6,946,549

(Patent Document 2) Korean Patent Publication No. 10-1996-0000173

SUMMARY OF THE INVENTION

Therefore, the present invention has been made in view of the above problems, and it is an object of the present invention to provide a dye having a highly saturated scarlet color and high water solubility by introducing an aryl group at a terminal of perylene and introducing a halogen group or a sulfonic acid group at a terminal of the aryl group, as a perylene analog formed through modification of perylene.

It is another object of the present invention to provide a highly saturated scarlet dye ink composition prepared by mixing the dye according to the present invention with distilled water, a surfactant, an additive, and the like.

It is another object of the present invention to provide a method of preparing the dye or ink composition according to the present invention.

It is another object of the present invention to provide a use of the dye or ink composition according to the present invention in a high-speed inkjet process.

It is another object of the present invention to provide a digital textile printing (DTP) method using the dye or ink composition according to the present invention.

In accordance with the present invention, the above and other objects can be accomplished by the provision of a scarlet dye including a compound represented by Formula 1 below:

[Formula 1]

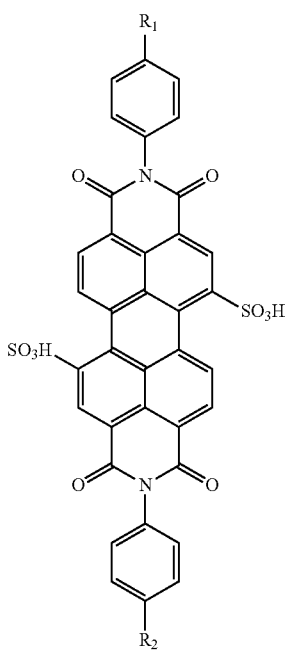

wherein, in Formula 1, $R_1$ may be any one selected from the group consisting of Cl, Br, and $SO_3H$, and $R_2$ may be any one selected from the group consisting of Cl, Br, and $SO_3H$.

The scarlet dye including the compound of Formula 1 may be a scarlet dye including a compound represented by Formula 2 below.

[Formula 2]

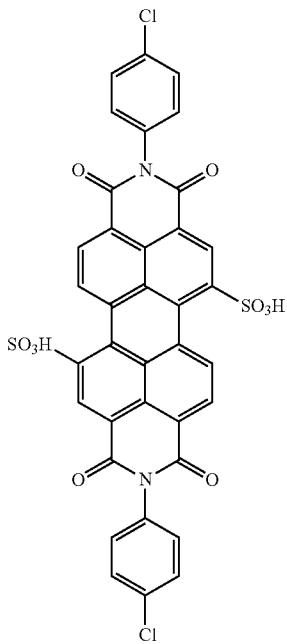

In addition, the scarlet dye including the compound of Formula 1 may be a scarlet dye including a compound represented by Formula 3 below.

[Formula 3]

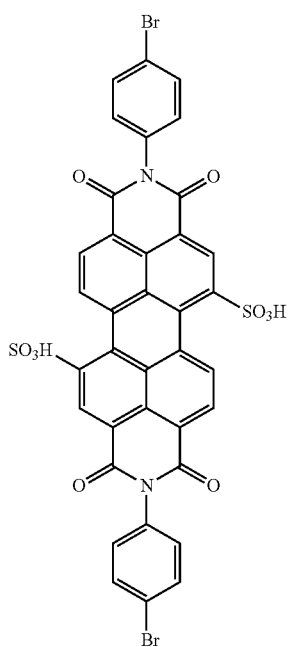

In addition, the scarlet dye including the compound of Formula 1 may be a scarlet dye including a compound represented by Formula 4 below.

[Formula 4]

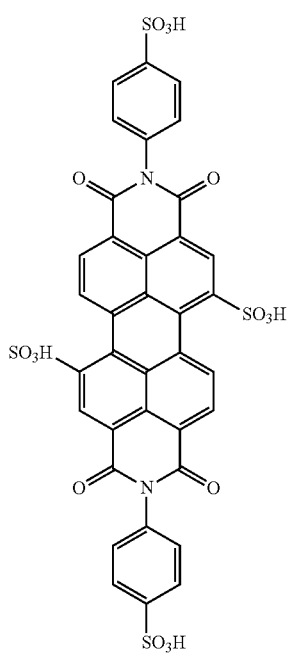

In accordance with an aspect of the present invention, the above and other objects can be accomplished by the provision of a scarlet dye ink composition including: the scarlet dye including a compound represented by any one of Formulae 1 to 4; distilled water; a surfactant; and an additive.

The scarlet dye ink composition may include:
about 3 wt % to about 10 wt % of the scarlet dye;
about 60 wt % to about 80 wt % of the distilled water;
about 5 wt % to about 15 wt % of the surfactant; and
about 5 wt % to about 25 wt % of the additive.

In the scarlet dye ink composition, the scarlet dye may be purified by a method including the following processes:

1) dissolving the scarlet dye before desalination in a dispersion solvent;

2) filtering a solution obtained by process 1) under reduced pressure;

3) precipitating the filtrate of process 2) in an organic solvent;

4) filtering the precipitate obtained by process 3) under reduced pressure and drying the resulting precipitate in a vacuum oven; and 5) removing free salt from the dried precipitate of process 4) through a membrane filter.

The additive may include one or more selected from the group consisting of alcohols, glycols, caprolactam, and glycerin.

In accordance with another aspect of the present invention, there is provided a high-speed inkjet printer including a scarlet dye ink composition including: the scarlet dye including a compound represented by any one of Formulae 1 to 4; distilled water; a surfactant; and an additive.

In accordance with another aspect of the present invention, there is provided a digital textile printing (DTP) method using a scarlet dye ink composition including the scarlet dye including a compound represented by any one of Formulae 1 to 4, distilled water, a surfactant, and an additive, and the above-described inkjet printer.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other objects, features and other advantages of the present invention will be more clearly understood from the following detailed description taken in conjunction with the accompanying drawings, in which.

DETAILED DESCRIPTION OF THE INVENTION

Figure 1:
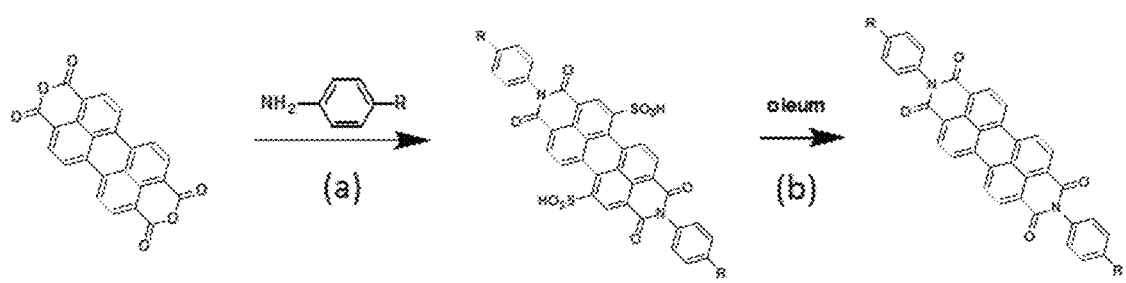
FIG. 1 is a schematic view illustrating the synthesis mechanism of dyes 1b to 3b prepared according to Examples 1 to 6.

Reference will now be made in detail to the preferred embodiments of the present invention, examples of which are illustrated in the accompanying drawings. Wherever possible, the same reference numbers will be used throughout the drawings to refer to the same or like parts.

Hereinafter, the present invention will be described in detail. A detailed description of known configurations or functions in connection with the description of the present invention will not be provided herein.

The terms or words used in the present specification and claims should not be construed as being limited to ordinary or dictionary meanings, but should be construed as having meanings and concepts consistent with the spirit of the present invention.

Embodiments described in the present specification and configurations illustrated in the accompanying drawings are merely exemplary embodiments of the present invention and do not represent all technical ideas of the present invention, and thus it should be understood that various equivalents and modifications that can replace these embodiments may be made at the time of filing the present application.

Hereinafter, the present invention will be described in more detail.

The present invention provides a scarlet dye including a compound represented by Formula 1 below:

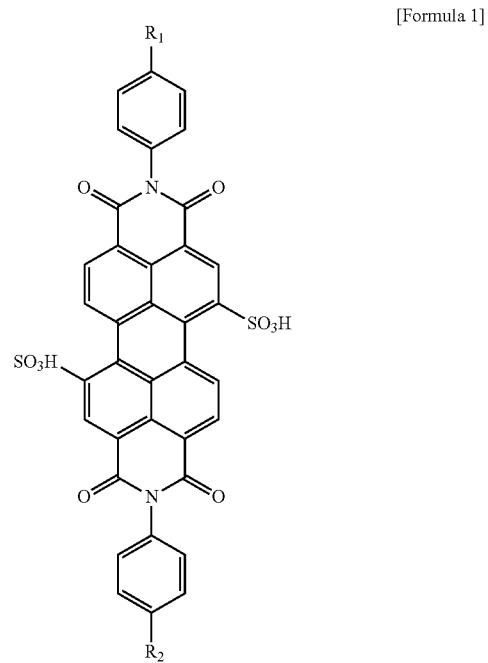

[Formula 1]

wherein, in Formula 1, $R_1$ may be any one selected from the group consisting of Cl, Br, and $SO_3H$, and $R_2$ may be any one selected from the group consisting of Cl, Br, and $SO_3H$.

The scarlet dye including the compound of Formula 1 may be a scarlet dye including a compound represented by Formula 2 below.

[Formula 2]

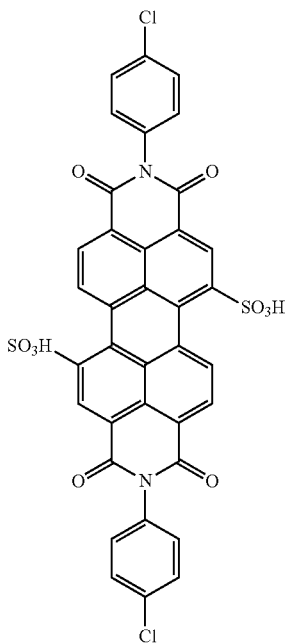

In addition, the scarlet dye including the compound of Formula 1 may be a scarlet dye including a compound represented by Formula 3.

[Formula 3]

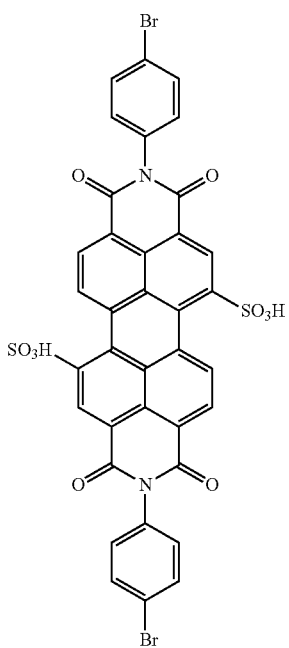

In addition, the scarlet dye including the compound of Formula 1 may be a scarlet dye including a compound represented by Formula 4.

[Formula 4]

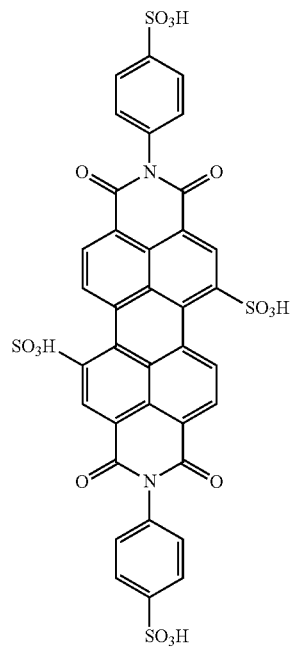

The scarlet dyes of the present invention are water-soluble anionic dyes containing a sulfonic acid group and may strongly bind to fiber containing a large number of carboxyl groups or amino groups in polypeptide polymer molecules, such as wool or silk, through salt formation or hydrogen bonding therewith.

Highly saturated deep-colored acidic dyes suitable for use in digital textile printing (DTP) require high water solubility, excellent color reproduction, high color developability, high ejection stability, and high fastness, and thus the inventors of the present invention selected perylene as a parent dye in accordance with these requirements.

However, perylene is generally used after being dissolved in an organic solvent due to the low water solubility thereof, and thus is limited in terms of applications thereof, and accordingly, the water solubility of perylene was improved through appropriate structural modification thereof.

In particular, the terminal position of perylene barely affects absorption wavelength regions, and thus an appropriate aryl group was introduced at the terminal of perylene through imidization, and this aryl group introduction reduced packing density, resulting in enhanced solubility.

In the present invention, bromine (Br) and chlorine (Cl), which are halogen elements, were introduced along with the aryl group to secure light fastness, and a sulfonic acid group ($SO_3H$) was introduced along with the aryl group to maximize water solubility.

Only a sulfonic acid group ($SO_3H$) is introduced at the bay position of perylene such that the characteristic absorption at a wavelength of early 500 nm of parent perylene is no longer batho-shifted, thereby exhibiting a scarlet color and high water solubility.

The synthesized dyes of the present invention exhibited thermal stability below 400° C. and had a degradation temperature between about 400° C. and about 550° C., from which it was confirmed that the perylene-based dyes of the present invention have excellent heat resistance.

As a result of setting an absorbance value to 1 before light irradiation and measuring relative absorbance values over time, it was confirmed that the perylene-based dyes of the present invention had an absorbance of about 0.9 even after light irradiation was completed (after 1,200 minutes). In particular, when a halogen element was introduced into these dyes of the present invention, the dyes exhibited excellent light fastness, i.e., an absorbance of 0.95 or higher, compared to existing dyes.

The scarlet dye including the compound of Formula 2 may be prepared, in particular, according to the following processes:

1) mixing perylene-3,4,9,10-tetracarboxylic dianhydride, 4-chloroaniline, m-cresol, and isoquinoline and refluxing the mixture;

2) heating the resulting mixture of process 1) in a nitrogen atmosphere;

3) blocking nitrogen and allowing a reaction to occur in the heated mixture of process 2);

4) adding the reaction product of process 3) into an organic solvent, filtering the precipitate, and then drying the filtrate in a vacuum;

5) washing the unpurified product obtained by process 4) until a green fluorescent color thereof disappears, and washing the unreacted material by ethanol reflux to thereby obtain N,N'-bis-(4-chlorophenyl)-3,4,9,10-perylenebis(dicarboximide);

6) adding the N,N'-bis-(4-chlorophenyl)-3,4,9,10-perylenebis(dicarboximide) obtained by process 5) into an oleum and refluxing the compound;

7) cooling the refluxed solution of process 6) and then adding the solution into an organic solvent dropwise;

8) adding the resulting solution of process 7) into an organic solvent, filtering the precipitate, and then drying the filtrate in a vacuum; and 9) dissolving the dried product of process 8) in distilled water to remove residual sulfuric acid.

The organic solvent used in processes 4) and 8) may be, for example, acetone, and the organic solvent used in process 7) may be, for example, dimethylformamide, but the present invention is not limited thereto. In addition, NaOH may be used in the washing process of process 5) until the green fluorescent color of the unpurified product disappears, but the present invention is not limited thereto.

The scarlet dye including the compound of Formula 3 may be prepared, in particular, according to the following processes:

1) mixing perylene-3,4,9,10-tetracarboxylic dianhydride; 4-bromoaniline; m-cresol; and isoquinoline and refluxing the mixture;

2) heating the resulting mixture of process 1) in a nitrogen atmosphere;

3) blocking nitrogen and allowing a reaction to occur in the heated mixture of process 2);

4) adding the reaction product of process 3) into an organic solvent, filtering the precipitate, and then drying the filtrate in a vacuum;

5) washing the unpurified product obtained by process 4) until a green fluorescent color thereof disappears, and washing the unreacted material by ethanol reflux to thereby obtain N,N'-bis-(4-bromophenyl)-3,4,9,10-perylenebis(dicarboximide);

6) adding the N,N'-bis-(4-bromophenyl)-3,4,9,10-perylenebis(dicarboximide) obtained by process 5) into an oleum and refluxing the compound;

7) cooling the refluxed solution of process 6) and then adding the solution into an organic solvent dropwise;

8) adding the resulting solution of process 7) into an organic solvent, filtering the precipitate, and then drying the filtrate in a vacuum; and 9) dissolving the dried product of process 8) in distilled water to remove residual sulfuric acid.

The organic solvent used in processes 4) and 8) may be, for example, acetone, and the organic solvent used in process 7) may be, for example, dimethylformamide, but the present invention is not limited thereto. In addition, NaOH may be used in the washing process of process 5) until the green fluorescent color of the unpurified product disappears, but the present invention is not limited thereto.

The scarlet dye including the compound of Formula 4 may be prepared, in particular, according to the following processes:

1) mixing perylene-3,4,9,10-tetracarboxylic dianhydride, sulfanilic acid, m-cresol, and isoquinoline and refluxing the mixture;

2) heating the resulting mixture of process 1) in a nitrogen atmosphere;

3) blocking nitrogen and allowing a reaction to occur in the heated mixture of process 2);

4) adding the reaction product of process 3) into an organic solvent, filtering the precipitate, and then drying the filtrate in a vacuum;

5) washing the unpurified product obtained by process 4) until a green fluorescent color thereof disappears, and washing the unreacted material by ethanol reflux to thereby obtain N,N'-bis-[4-(sulfuric acid)phenyl-3,4,9,10-perylenebis(dicarboximide)];

6) adding the N,N'-bis-[4-(sulfuric acid)phenyl-3,4,9,10-perylenebis(dicarboximide)] obtained by process 5) into an oleum and refluxing the compound;

7) cooling the refluxed solution of process 6) and then adding the solution into an organic solvent dropwise;

8) adding the resulting solution of process 7) into an organic solvent, filtering the precipitate, and then drying the filtrate in a vacuum; and 9) dissolving the dried product of process 8) in distilled water to remove residual sulfuric acid.

The organic solvent used in processes 4) and 8) may be, for example, acetone, and the organic solvent used in process 7) may be, for example, dimethylformamide, but the present invention is not limited thereto. In addition, NaOH may be used in the washing process of process 5) until the green fluorescent color of the unpurified product disappears, but the present invention is not limited thereto.

The present invention also provides a scarlet dye ink composition including:
the scarlet dye of one of Formulae 1 to 4;
distilled water;
a surfactant; and
an additive.

The scarlet dye ink composition may include:
about 3 wt % to about 10 wt % of the scarlet dye;
about 60 wt % to about 80 wt % of the distilled water;
about 5 wt % to about 15 wt % of the surfactant; and
about 5 wt % to about 25 wt % of the additive.

The scarlet dyes of Formulae 1 to 4 prepared according to the above-described processes are water-soluble dyes and need to be purified such that the dyes are stably soluble in an aqueous solution state in order to be prepared into ink, and purification may be performed to reduce the amount of free salt present in the form of an impurity in a dye substance in an aqueous solution state. The dye purification process may include the following processes:

1) dissolving the scarlet dye before desalination in a dispersion solvent;
2) filtering the resulting solution of process 1) under reduced pressure;
3) precipitating the filtrate of process 2) in an organic solvent;
4) filtering the precipitate of process 3) under reduced pressure and drying the filtrate in a vacuum oven; and
5) removing free salt from the dried precipitate of process 4) through a membrane filter.

The additive may include one or more selected from the group consisting of alcohols, glycols, caprolactam, and glycerin, and may act as a moisturizer and a rheology modifier.

The surfactant may be, for example, a non-ionic or fluorine-based surfactant, but the present invention is not limited thereto.

Ink for a high-speed printer requires high viscosity compared to ink for a low-speed printer, and thus it may be very important to select a moisturizer, a rheology modifier, a surfactant, and the like, in addition to a dye and a solvent.

The moisturizer is used to prevent nozzles from being clogged by preventing ink at the nozzles from drying, and mostly aids in adjusting the viscosity of ink.

In addition, the surfactant adjusts the surface tension of ink, thereby affecting meniscus formation of ink droplets and ink wetting, and the selection of the rheology modifier is also very important in the adjustment of rheological properties.

When a surfactant and additive that have poor compatibility with the dye are used, a precipitate is generated after filtering, and therefore, compatibility of the surfactant and the additive with the dye is very important, and a surfactant that is highly compatible with the dye may be a non-ionic or fluorine-based surfactant, and the additive may include one or more selected from the group consisting of alcohols, glycols, caprolactam, and glycerin.

In addition, when desired rheological properties are forcibly adjusted using large amounts of a surfactant and an additive, they act as a factor that inhibits the stability of ink, and when the surfactant and the additive are used in small amounts, the desired effects thereof cannot be anticipated, and thus the surfactant may be used in an amount of about 5 wt % to about 15 wt % and the additive may be used in an amount of about 5 wt % to about 25 wt %.

The present invention also provides a high-speed inkjet printer including a scarlet dye ink composition including:
the scarlet dye of one of Formulae 1 to 4;
distilled water;
a surfactant; and
an additive.

The present invention also provides a digital textile printing (DTP) method using the above-described inkjet printer and a scarlet dye ink composition including the scarlet dye of one of Formulae 1 to 4, distilled water, a surfactant, and an additive.

Hereinafter, the present invention will be described in further detail with reference to the following examples and experimental examples. It will be obvious to those of ordinary skill in the art that these examples and experimental examples are provided for illustrative purposes only and are not intended to limit the scope of the present invention.

Example 1. Preparation of N, N'-bis-(4-chlorophenyl)-3,4,9,10-perylenebis(dicarboximide)

A mixture of 20 g (0.051 mol) of perylene-3,4,9,10-tetracarboxylic dianhydride, 12.76 g (0.10 mol) of 4-chloroaniline, 400 ml of m-cresol, and 30 ml of isoquinoline was refluxed overnight at 50° C. The resulting mixture was heated to 130° C. in a nitrogen atmosphere, nitrogen gas was blocked when the temperature was raised to 130° C., a reaction was allowed to occur in the mixture at 130° C. for 5 hours, and then the temperature was raised to 150° C. and maintained for 4 hours. Subsequently, the reaction product was stirred overnight at 200° C. to thereby complete the reaction. The completely reacted solution was poured into 150 ml of acetone, and then the precipitate was filtered and dried in a vacuum at 100° C. for 2 hours. The dried unpurified product was washed with 5% NaOH until the characteristic green fluorescent color of the perylene-3,4,9,10-tetracarboxylic dianhydride disappeared, and the unreacted 4-chloroaniline, m-cresol and isoquinoline were washed through ethanol reflux at 80° C. for 2 hours. The yield was 82.7%.

Example 2. Preparation of N,N'-bis(4-chlorophenyl)-1,7-(disulfuric acid)perylene-3,4,9,10-tetra carboxydiimide (1b)

25.68 g (0.042 mol) of N,N'-bis-(4-chlorophenyl)-3,4,9,10-perylenebis(dicarboximide) was added into 160 ml of oleum (20% $SO_3$) and refluxed overnight at 145° C. The refluxed solution was cooled down to room temperature and added dropwise into 600 ml of dimethylformamide. The mixed solution was poured into 3,000 ml of acetone, and then the precipitate was filtered and then dried in a vacuum at 40° C. The product was dissolved in 2,000 ml of distilled water to remove residual sulfuric acid. The yield was 68.6%.

Example 3. Preparation of N,N'-bis-(4-bromophenyl)-3,4,9,10-perylenebis(dicarboximide)

A mixture of 20 g (0.051 mol) of perylene-3,4,9,10-tetracarboxylic dianhydride, 1.20 g (0.10 mol) of 4-bromoaniline, 400 ml of m-cresol, and 30 ml of isoquinoline was refluxed overnight at 50° C. The resulting mixture was heated to 130° C. in a nitrogen atmosphere, nitrogen gas was blocked when the temperature was raised to 130° C., a reaction was allowed to occur in the mixture at 130° C. for 5 hours, and then the temperature was raised to 150° C. and maintained for 4 hours. Subsequently, the reaction product was stirred overnight at 200° C. to thereby complete the reaction. The completely reacted solution was poured into 150 ml of acetone, and then the precipitate was filtered and dried in a vacuum at 100° C. for 2 hours. The dried unpurified product was washed with 5% NaOH until the characteristic green fluorescent color of the perylene-3,4,9,10-tetracarboxylic dianhydride disappeared, and the unreacted 4-chloroaniline, m-cresol and isoquinoline were washed through ethanol reflux at 80° C. for 2 hours. The yield was 80.8%.

Example 4. Preparation of N,N'-bis(4-boromophenyl)-1,7-(disulfuric acid)perylene-3,4,9,10-tetracarboxydiimide (2b)

28.71 g (0.041 mol) of N,N'-bis-(4-bromophenyl)-3,4,9,10-perylenebis(dicarboximide) was added into 160 ml of oleum (20% $SO_3$) and refluxed overnight at 145° C. The refluxed solution was cooled down to room temperature and added dropwise into 600 ml of dimethylformamide. The mixed solution was poured into 3,000 ml of acetone, and then the precipitate was filtered and then dried in a vacuum at 40° C. The product was dissolved in 2,000 ml of distilled water to remove residual sulfuric acid. The yield was 72.3%.

Example 5. Preparation of N,N'-bis-[4-(sulfuric acid)phenyl]-3,4,9,10-perylenebis(dicarboximide)

A mixture of 20 g (0.051 mol) of perylene-3,4,9,10-tetracarboxylic dianhydride, 17.32 g (0.10 mol) of sulfanilic acid, 400 ml of m-cresol, and 30 ml of isoquinoline was refluxed overnight at 50° C. The resulting mixture was heated to 130° C. in a nitrogen atmosphere, nitrogen gas was blocked when the temperature was raised to 130° C., a reaction was allowed to occur in the mixture at 130° C. for 5 hours, and then the temperature was raised to 150° C. and maintained for 4 hours. Subsequently, the reaction product was stirred overnight at 200° C. to thereby complete the reaction. The completely reacted solution was poured into 150 ml of acetone, and then the precipitate was filtered and dried in a vacuum at 100° C. for 2 hours. The dried unpurified product was washed with 5% NaOH until the characteristic green fluorescent color of the perylene-3,4,9, 10-tetracarboxylic dianhydride disappeared, and the unreacted 4-chloroaniline, m-cresol and isoquinoline were washed through ethanol reflux at 80° C. for 2 hours. The yield was 78.4%.

Example 6. Preparation of N,N'-bis[4-(sulfuric acid) phenyl]-1,7-(disulfuric acid)perylene-3,4,9,10-tetra carboxydiimide (3b)

27.40 g (0.039 mol) of N,N'-bis-[4-(sulfuric acid)phenyl]-3,4,9,10-perylenebis(dicarboximide) was added to 160 ml of oleum (20% $SO_3$) and refluxed overnight at 145° C. The refluxed solution was cooled down to room temperature and added dropwise into 200 ml of dimethylformamide. The mixed solution was poured into 3,000 ml of acetone, and then the precipitate was filtered and then dried in a vacuum at 40° C. The product was dissolved in 2,000 ml of distilled water to remove residual sulfuric acid. The yield was 70.3%.

A schematic view for the synthesis mechanism of 1b to 3b prepared according to Examples 1 to 6 is illustrated in FIG. 1.

Evaluation Example 1. Properties of Dyes

Dyes 1b to 3b, synthesized according to Examples 1 to 6, are water-soluble anionic dyes containing a sulfonic acid group and may strongly bind to fiber containing a large number of carboxyl groups or amino groups in polypeptide polymer molecules, such as wool or silk, through salt formation or hydrogen bonding therewith.

Highly saturated deep-colored acidic dyes suitable for use in high-speed digital textile printing (DTP) require high water solubility, excellent color reproduction, high color developability, high ejection stability, and high fastness, and thus perylene was selected as a parent dye in accordance with these requirements. Perylene is generally used after being dissolved in an organic solvent due to the low solubility thereof, and thus is limited in applications thereof.

The poor water solubility of perylene was overcome through appropriate structural modification thereof. Since the terminal position of perylene has little effect on the absorption wavelength region, an appropriate aryl group was introduced through imidization. Such aryl group introduction was able to enhance solubility by reducing packing density.

In the case of 1b and 2b, Br and Cl, which are halogen elements, were respectively introduced along with the aryl group to secure light fastness, and in the case of 3b, the sulfonyl group was introduced along with the aryl group to maximize water solubility.

At the bay position of each of 1b to 3b, only the sulfonic acid group was introduced such that characteristic absorption at a wavelength of early 500 nm of parent perylene is no longer batho-shifted, so that the dyes 1b to 3b had a scarlet color and increased water solubility.

As a result of measuring the water solubility of 1b to 3b, 1b to 3b all exhibited high water solubility, i.e., 15 wt % or higher, and particularly, the water solubility of 3b having a great number of sulfonic acid groups was high, e.g., 20 wt % or higher.

Evaluation Example 2. Evaluation of Spectroscopic Properties of Dyes

Figure 2:
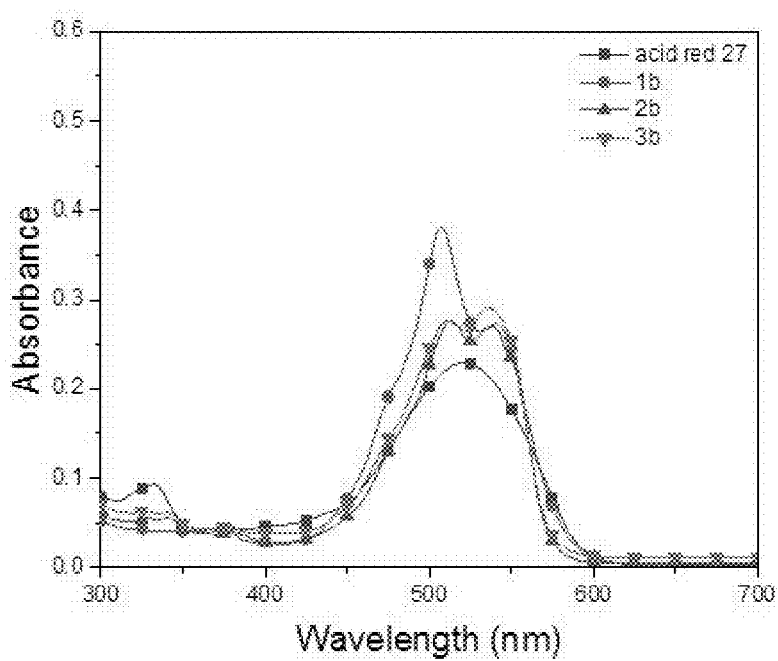
FIG. 2 is a graph showing UV-Vis absorption spectra of dyes 1b to 3b of Examples 1 to 6.

The UV-Vis absorption spectra of the dyes 1b to 3b measured at $10^{-5}$ M in water are illustrated in FIG. 2, and corresponding data are shown in Table 1 below. The synthesized dyes substantially had an absorption band between 500 nm and 550 nm and exhibited a high molar extinction coefficient, i.e., 25,000 to 40,000. This results not only from high color intensity of parent perylene, but also from the water solubility, which is effectively enhanced through the introduction of a solubilizing group. In the case in which a bulky sulfonyl group with high polarity was introduced, the ionic nature of the functional group considerably increased the solubility of the dye in water. When the water solubility of the dye increases, the probability of being present as a single molecule increases, and thus the color developability of each dye molecule is increased, resulting in increased color intensity.

In addition, an absorption peak form having two absorption maxima appeared. This is because a single molecule and aggregated molecules have different absorption maxima. Generally, as the concentration becomes lower, the probability of being present as a single molecule increases, and as the concentration increases, the tendency to aggregate becomes stronger, and thus one peak appears at each maximum, but it was confirmed from this experiment that since the two cases were present at a measurement concentration of 10 μM, absorption peaks appeared separately.

Substitution of the terminal of perylene barely affects the absorption wavelength region, and thus the dyes 1b to 3b exhibited little change in absorption maxima in accordance with the substituent.

Figure 10:
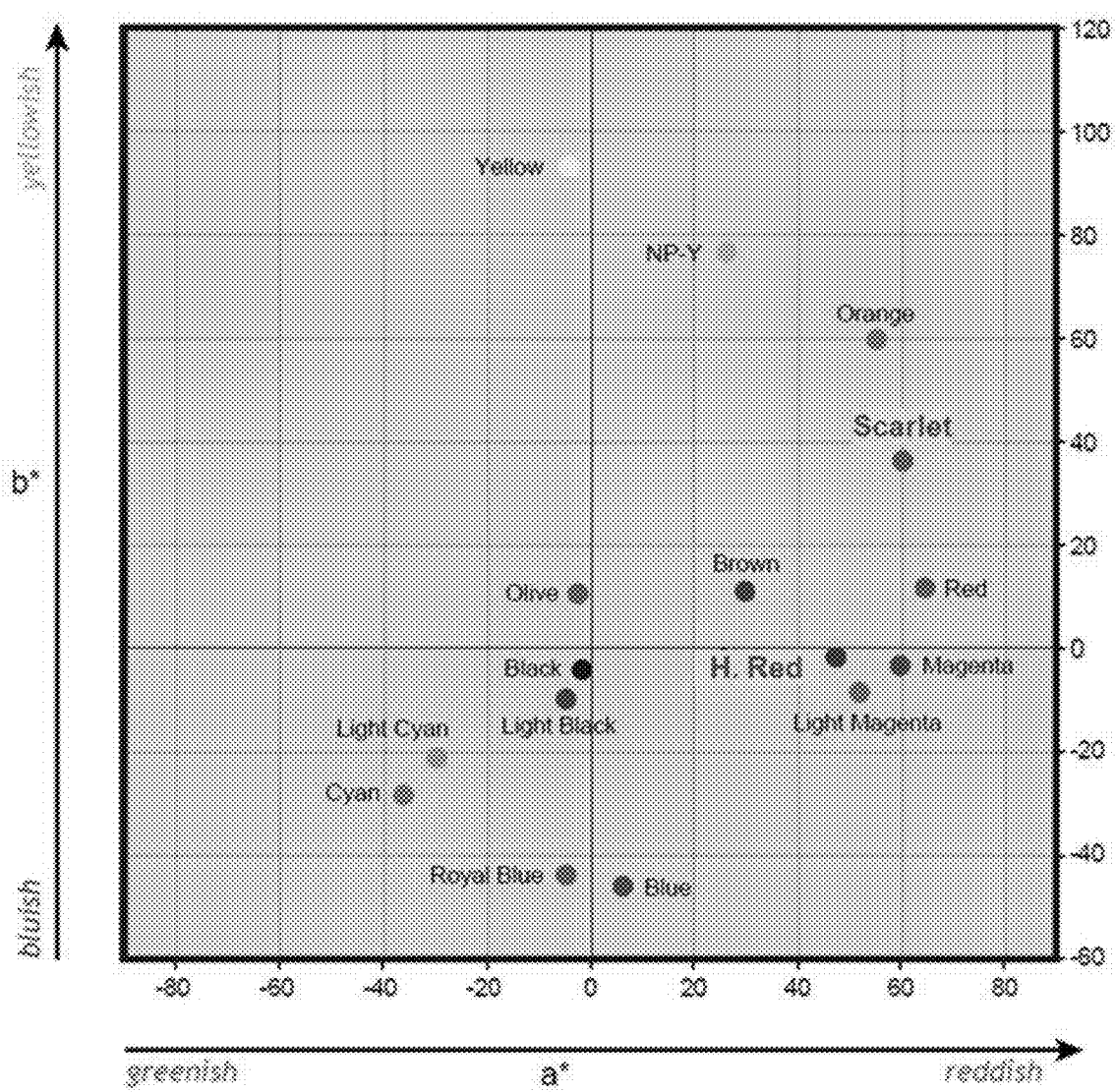
FIG. 10 is a color map showing color coordinates of dye inks with 10 colors generally used in DTP and 6 colors assumed to be additionally required.

In terms of applications for DTP, the dyes 1b to 3b are suitable for a scarlet color since they have absorption maxima at early 500 nm and cover mid 500 nm. The color coordinates generally used in the dyeing industry are illustrated in FIG. 10. In particular, the synthesized dyes have an overall sharp peak and a high molar extinction coefficient as compared to a commercially available dye, i.e., acid red 27, and thus have high color developability even with a small amount of dye.

TABLE 1

| Dye | $\lambda_{max}$ (nm) (after 1,200 min) | $\varepsilon_{max}$ (L mol$^{-1}$cm$^{-1}$) |
|---|---|---|
| Acid red 27 | 521 | 23000 |
| 1b | 508, 541 | 38100, 27300 |

TABLE 1-continued

| Dye | $\lambda_{max}$ (nm) (after 1,200 min) | $\varepsilon_{max}$ (L mol$^{-1}$cm$^{-1}$) |
|---|---|---|
| 2b | 512, 540 | 25700, 25000 |
| 3b | 512, 536 | 27600, 29100 |

Figure 3:
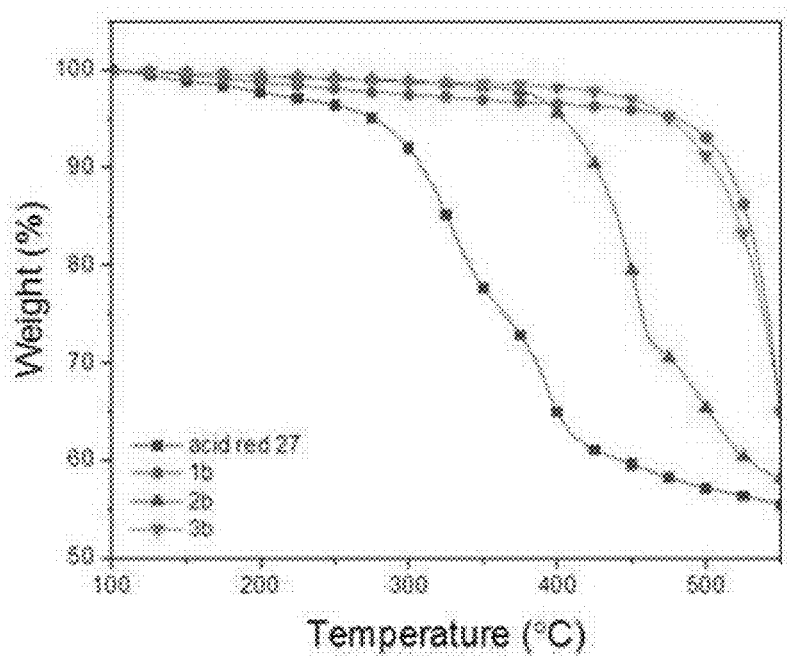
FIG. 3 is a graph showing thermograms of dyes 1b to 3b of Examples 1 to 6 and acid red 27 dye as a control.

Evaluation Example 3. Evaluation of Thermal Stability and Light Stability of Dyes The thermal stability of each sample was investigated by a TGA method under an N$_2$ atmosphere. The TGA thermograms of 1b to 3b and acid red 27 as a control are shown in FIG. 3. Related data including maximum mass loss temperatures (Tmax) are shown in Table 2.

Generally, substances having a higher intermolecular attraction tend to have higher thermal stability. That is, for high thermal stability, intermolecular attraction has to be strong and molecules have to be densely aggregated.

Synthesized perylene derivatives have a flat molecular structure due to the large number of aromatic rings thereof. This contributes to p-p interaction, and consequently, intermolecular packing may occur to thus form a compact aggregate.

Furthermore, intermolecular interactions (van der Waals force and dipole-dipole interactions) may be enhanced by high molecular weights and the substitution of polar groups at bay positions.

The synthesized dyes exhibit thermal stability at 400° C. and have a degradation temperature between 400° C. and 550° C. As shown in Table 2, it can be confirmed that the dye 2b has a high Td of 400° C. or higher and that the dyes 1b and 3b have a high Td of 500° C. or higher, and this is due to the possibility of adjusting solubility by reducing packing density through substitution of the terminal group with an aryl group and a structural effect in which intermolecular aggregation can act strongly. In summary, it was confirmed that the synthesized dyes 1b to 3b had excellent thermal resistance, i.e., 1.5 times or more that of acid red 27.

Figure 4:
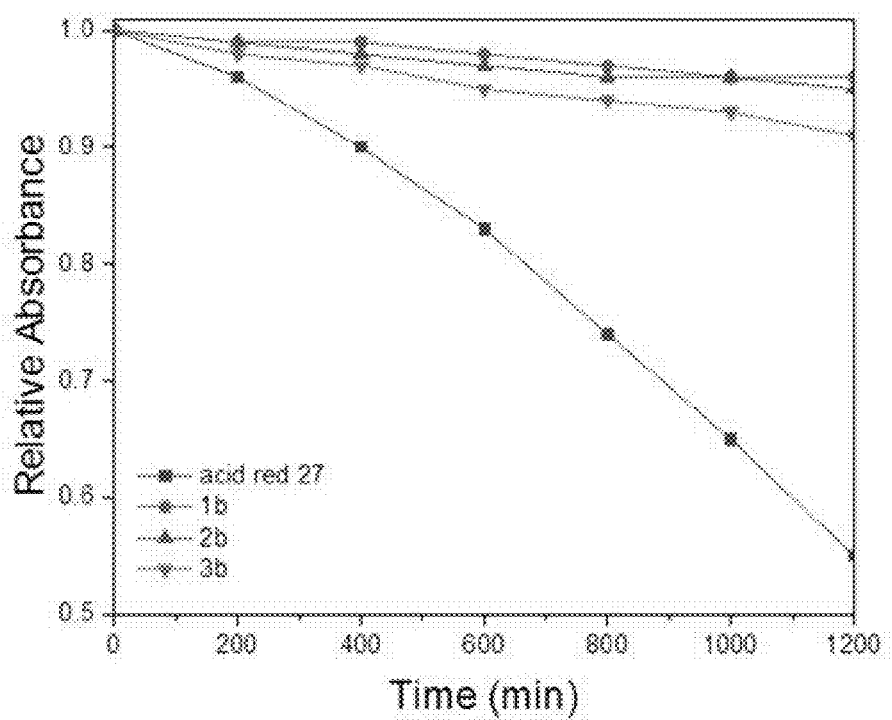
FIGS. 4 and 5 are graphs showing relative absorbance with respect to time of dyes 1b to 3b of Examples 1 to 6 and acid red 27 dye as a control.
Figure 5:
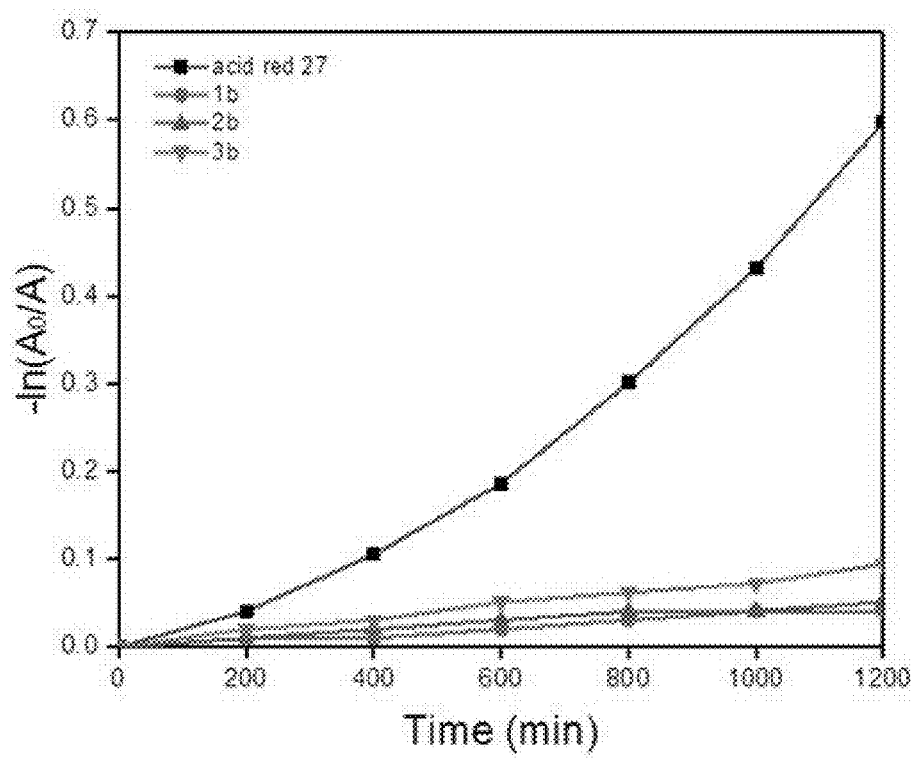

The relative absorbance of the dyes 1b to 3b and acid red 27 over time is illustrated in FIGS. 4 and 5. Related data including absorption maxima and decomposition factors are shown in Table 2.

Generally, the stronger the aggregation of a dye, the higher the light fastness.

As described above with regards to thermal stability, the synthesized perylene derivatives are able to structurally form a compact aggregate and have strong intermolecular attraction.

An absorbance value before light irradiation was set to 1 and relative absorbance values over time were measured. As a result, it was confirmed that, even after final irradiation with light (1,200 minutes), the synthesized dyes 1b to 3b had an absorbance of about 0.9. In particular, it was confirmed that the dyes 1b and 2b, into which the halogen elements were introduced, had an absorbance of 0.95 or higher, which indicates very high light fastness, and acid red 27 dye as a control had an absorbance of about 0.5, and thus the synthesized dyes 1b to 3b had much higher light fastness than that of acid red 27 dye.

It was also confirmed that the dyes 1b to 3b had a photodegradation rate constant of less than 10*10$^{-5}$ min$^{-1}$.

It confirmed that the dyes 1b to 3b exhibited little change in absorption maxima after final light irradiation, while exhibiting a slight hypsochromic shift, whereas acid red 27 as a control exhibited a bathochromic shift of about 4 nm.

TABLE 2

| Dye | $\lambda_{max}$ (nm) (after 1200 min) | K (min$^{-1}$) | Td (° C.) |
|---|---|---|---|
| Acid red 27 | 502 (→ 506) | 49.45*10$^{-5}$ | 291 |
| 1b | 508, 541 (→ 508, 540) | 3.65*10$^{-5}$ | 524 |
| 2b | 512, 540 (→ 510, 540) | 4.21*10$^{-5}$ | 422 |
| 3b | 512, 536 (→ 510, 534) | 7.48*10$^{-5}$ | 513 |

Example 7. Purification of Dyes

The synthesized dyes 1b to 3b are water-soluble dyes, and it may be considered to be a core technique to purify these dyes such that the dyes are stably soluble in an aqueous solution state to be prepared into ink, and for this, first, the amount of free salt, present in the form of an impurity in a dye substance in an aqueous solution state, was reduced. To remove such free salt, the following processes were performed.

Figure 6:
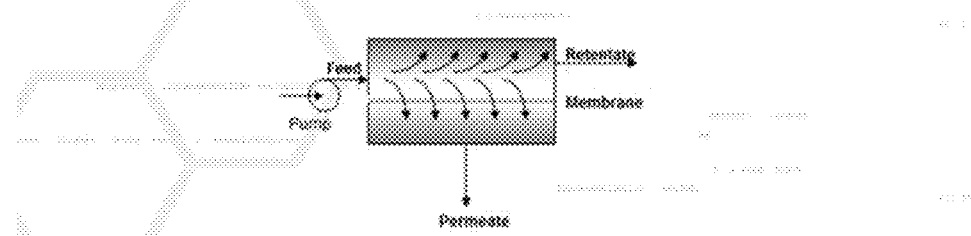
FIG. 6 is a schematic view illustrating a process of removing a free salt through a membrane filter.

1. A dye before desalination was added to 1 mL to 3 mL/g (dye) of DMF and dissolved therein as thoroughly as possible.
2. The resulting solution was filtered under reduced pressure, and the filtrate was precipitated in ethyl acetate (EA) in an amount 10 times that of DMF.
3. The precipitated dye was filtered under reduced pressure and dried in a vacuum oven (80° C.).
4. A free salt was removed through a membrane filter in an aqueous solution state such that dye molecules having a relatively large molecular weight were unable to pass through the membrane filter, and dye molecules having a relatively small molecular weight passed through the membrane filter (see FIG. 6).

Example 8. Preparation of Ink 70 wt % of distilled water, 5 wt % of a non-ionic surfactant, 20 wt % of an alcoholic additive, and 5 wt % of a dye (one of the dyes 1b to 3b) were sufficiently mixed to thereby prepare ink. When ink formulation was performed, all of the dyes 1b to 3b had high compatibility with distilled water and other assistant agents, from which it was confirmed that a uniform solution was formed.

Evaluation Example 4. Evaluation of Physical and Rheological Properties of Ink

Ink for a high-speed printer requires high viscosity compared to ink for a low-speed printer, and thus it may be very important to select a moisturizer, a rheology modifier, a surfactant, and the like, other than a dye and a solvent. The moisturizer is used to prevent nozzles from being clogged by preventing ink at the nozzles from drying, and mostly aids in adjusting the viscosity of ink. In addition, the surfactant adjusts the surface tension of ink, thereby affecting meniscus formation of ink droplets and ink wetting, and the selection of the rheology modifier is also very important in the adjustment of rheological properties.

Therefore, when selecting a surfactant and an additive, compatibility of the dye therewith is very important, and the optimum surfactant and additive and appropriate amounts thereof were determined through various experiments.

When a surfactant and an additive that have poor compatibility with the dye were used, a precipitate was generated after filtering. In addition, when desired rheological properties were forcibly adjusted using large amounts of a surfactant and an additive, they acted as a factor that inhibits the stability of ink.

Figure 7:
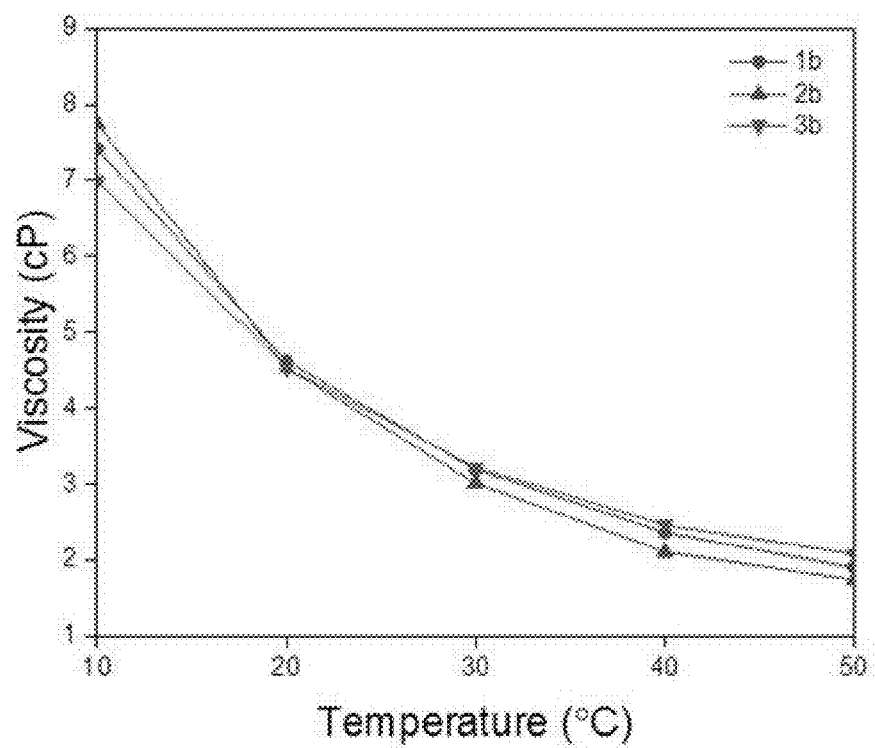
FIG. 7 is a graph showing values obtained by measuring the viscosity of dye inks 1b to 3b prepared according to Examples 1 to 8 at a temperature ranging from 10° C. to 50° C.

Viscosity values of the dyes 1b to 3b, which were measured at a temperature ranging from 10° C. to 50° C., are illustrated in FIG. 7 and the corresponding data is shown in Table 3. All the dyes exhibited reduced viscosity in accordance with an increase in temperature. In addition, the measured viscosity range may be within the normal operating range of general inkjet printers. This low viscosity value of ink was obtained using butanol-2 or butyl monoethyl ether of glycerol instead of generally used propanol-2.

TABLE 3

| Temperature(° C.) | Viscosity (cP) | | |
|---|---|---|---|
| | 1b | 2b | 3b |
| 10 | 7.41 | 7.74 | 6.99 |
| 20 | 4.62 | 4.53 | 4.53 |
| 30 | 3.19 | 3.01 | 3.22 |
| 40 | 2.36 | 2.11 | 2.46 |
| 50 | 1.90 | 1.74 | 2.08 |

Evaluation Example 5. Evaluation of Storage Stability of Ink

For the storage stability of ink, low-temperature/room-temperature/high-temperature storage stability and temperature hysteresis were analyzed.

Each of the inks 1b to 3b was stored at a low temperature (5° C.), room temperature (25° C.), and a high temperature (45° C.) for 2 weeks, 4 weeks, and 8 weeks, and then the temperature was adjusted to room temperature (25° C.) to measure viscosity. During the 8 weeks following ink formulation, changes in viscosity at a low temperature (5° C.), room temperature (25° C.), and a high temperature (45° C.) were measured in real time, and as a result, the case of little change in viscosity for 8 weeks may be determined as stable. Generally, a period that is 3 times the period used in the high-temperature storage stability test is regarded as room-temperature storage stability, and thus the case in which storage stability at a high temperature for 8 weeks is satisfied may be regarded as having storage stability at room temperature for about 24 weeks. For temperature hysteresis, viscosity measurement was started at room temperature (25° C.), the temperature was immediately decreased to 5° C., and then changes in viscosity were observed while the temperature was raised to 50° C., and when the temperature was returned to room temperature (25° C.), the width of the range exceeding the initial viscosity value was observed. This is also closely related to the storage stability of ink.

As shown in Table 4 below, as a result of time-dependent change analysis, all of the inks exhibited excellent storage stability due to the high compatibility thereof. As a result of measuring the viscosity of each of the prepared inks after being stored at 5° C., 25° C., and 45° C. for 2 weeks, 4 weeks, and 8 weeks and adjusting the temperature to 25° C., there were little changes in viscosity, from which it was confirmed that the inks had high storage stability.

TABLE 4

| Test temperature | Storage time (weeks) | 1b | 2b | 3b |
|---|---|---|---|---|
| 5° C. | 0 | 3.80 | 3.93 | 3.74 |
| | 2 | 3.79 | 3.94 | 3.72 |
| | 4 | 3.81 | 3.95 | 3.72 |
| | 8 | 3.82 | 3.97 | 3.74 |
| | Diff (0 – 8 weeks) | 0.02 | 0.04 | 0.00 |
| 25° C. | 0 | 3.80 | 3.93 | 3.74 |
| | 2 | 3.81 | 3.95 | 3.73 |
| | 4 | 3.83 | 3.94 | 3.71 |
| | 8 | 3.81 | 3.95 | 3.71 |
| | Diff (0 – 8 weeks) | 0.01 | 0.02 | −0.03 |
| 45° C. | 0 | 3.80 | 3.93 | 3.74 |
| | 2 | 3.82 | 3.96 | 3.77 |
| | 4 | 3.81 | 3.97 | 3.74 |
| | 8 | 3.82 | 3.98 | 3.73 |
| | Diff (0 – 8 weeks) | 0.02 | 0.05 | −0.01 |

Figure 8:
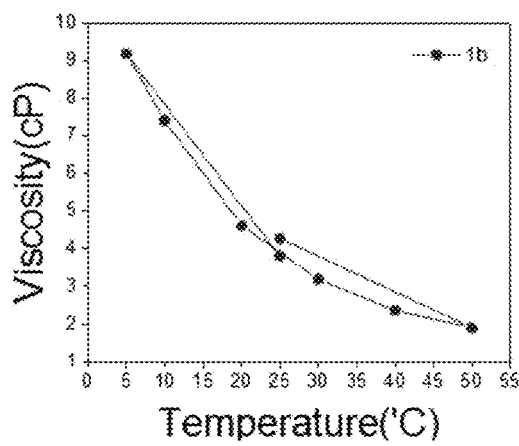
FIG. 8 is a set of graphs showing temperature hysteresis of dye inks 1b to 3b of Example 1 to 8.
Figure 8:
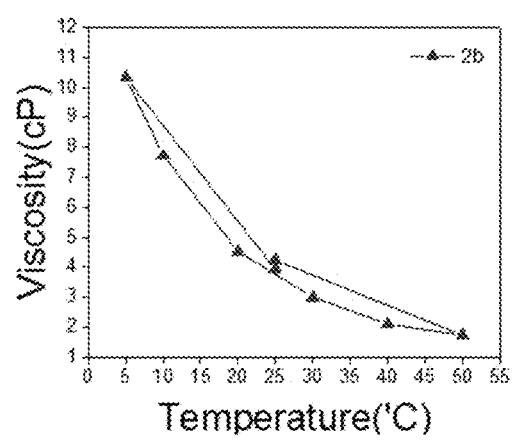
Figure 8:
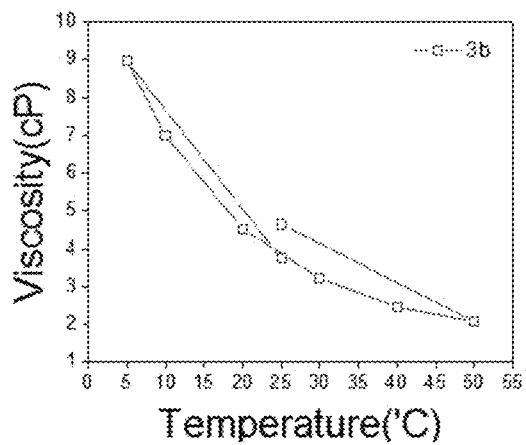

As illustrated in FIG. 8, as a result of hysteresis analysis, all of the inks 1b to 3b exhibited excellent storage stability due to the high solubility thereof. For the prepared inks, a starting temperature was 25° C., the temperature was immediately decreased to 5° C., and the temperature was then raised to 50° C. At this time, changes in viscosity were measured every 10° C., and when the temperature was returned to 25° C., the width of the range exceeding the initial viscosity was measured. The width of the range exceeding the initial viscosity was very narrow, from which it was also confirmed that the prepared inks exhibited very high storage stability.

TABLE 5

| Dye | Surface tension (mN/m) | Electrical conductivity (mS/m) | pH |
|---|---|---|---|
| 1b | 33.5 | 156 | 5.5 |
| 2b | 33.9 | 144 | 5.2 |
| 3b | 35.8 | 174 | 5.6 |

The electrical conductivity of the prepared inks was within a range suitable for digital printing applications. As shown in Table 5, the ink 3b had relatively high electrical conductivity, and this may result from the presence of a larger number of ionizable sulfonic acid groups in a molecular structure.

In the case of ink for a high-speed printer, it is required to prepare ink that undergoes a small change in viscosity over time in order to achieve stable injection, and it is also required to prepare ink that undergoes an almost similar change in viscosity over time according to color.

Generally, as the criteria of physical properties suitable for drop-on-demand ultra-high-speed printer heads, viscosity at 25° C. is 5 cP or less, and surface tension ranges from 21 mN/m to 48 mN/m.

Evaluation Example 6. Evaluation of Color Properties of Inks

The inks 1b to 3b were used to perform printing using an Epson L120 inkjet printer equipped with a general head at 1,200 dots per inch (dpi) and color coordinates were measured using a computer color matching (CCM) system. The inks 1b to 3b were marked on the color coordinates and compared with the color coordinates of 16 colors commonly used in the dyeing industry (see FIGS. 9 and 10).

Figure 9:
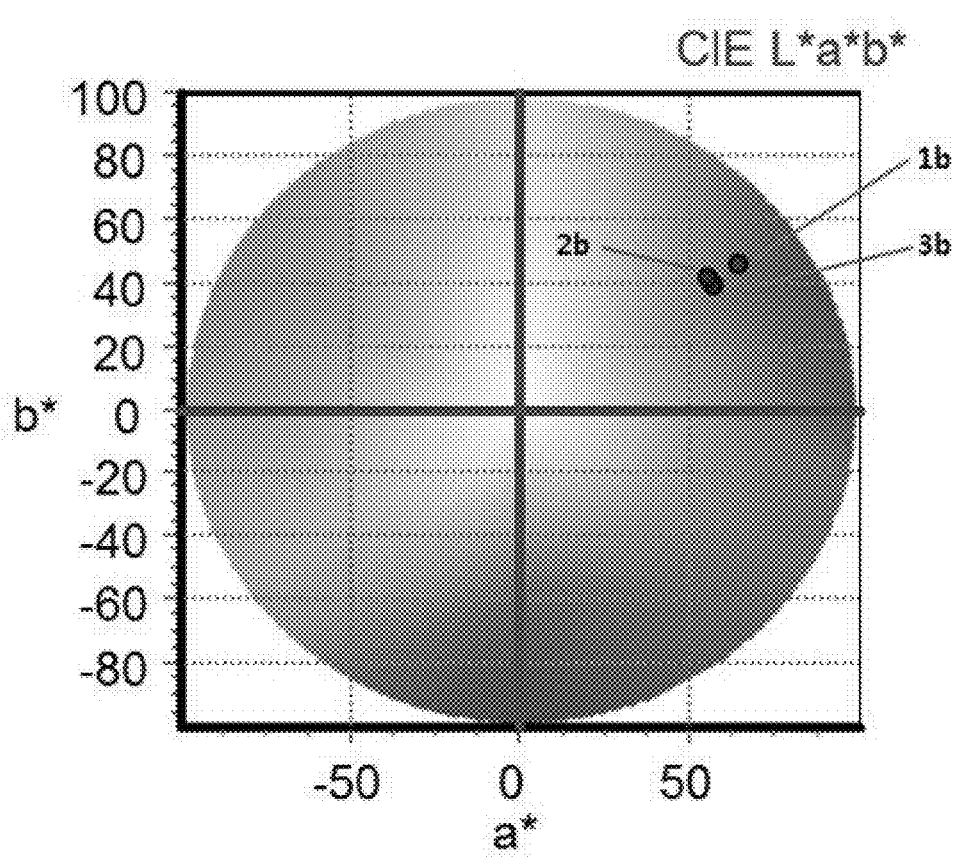
FIG. 9 is a graph showing color coordinates of dye inks 1b to 3b of Examples 1 to 8, measured by a 16-color CCM system.

Inks for DTP including the dyes 1b to 3b exhibit a scarlet color, and thus may develop a highly saturated deep color other than the basic color composition of existing DTP (yellow, magenta, light magenta, cyan, light cyan, light black, black, orange, blue, and red). These inks may address the disadvantages of DTP, which has limitations in developing pale/deep colors and highly saturated colors, as compared to analog-type textile printing, in which dye mixing and application are relatively unrestricted. The color coordinates of the inks 1b to 3b measured using the CCM system are illustrated in FIG. 9, and the corresponding data are shown in Table 6.

The inks 1b to 3b exhibited color coordinates suitable for a scarlet color. The ink 1b had the highest color intensity among the inks 1b to 3b and especially had a very high molar extinction coefficient of about 500 nm, thus exhibiting the greatest a* and b* coordinates. In contrast, the ink 3b had the smallest b* coordinate due to the higher absorption maximum on the long wavelength side among the three dyes.

TABLE 6

| Dye | L | a | b |
|---|---|---|---|
| 1b | 38.79 | 64.23 | 45.47 |
| 2b | 37.35 | 56.32 | 42.19 |
| 3b | 36.12 | 57.99 | 38.54 |

Experimental Example 7. Evaluation of Inkjet Printing Performance of Inks

Ink droplet formation was observed using an inkjet printer (Dimatix (DMP2800), 10 pl head, under printing conditions of 18 V and 2 kHz), and injection stability was evaluated and the accuracy of dot pattern formation was observed.

Stability adjustment of flight of droplet according to changes in voltage and adjustment of injection stability according to changes in Hz were observed.

For mass ink ejectability, the number of clogged nozzles among 2,048 nozzles was measured using a test kit with a 600 dpi-grade KYOCERA head.

Figure 11:
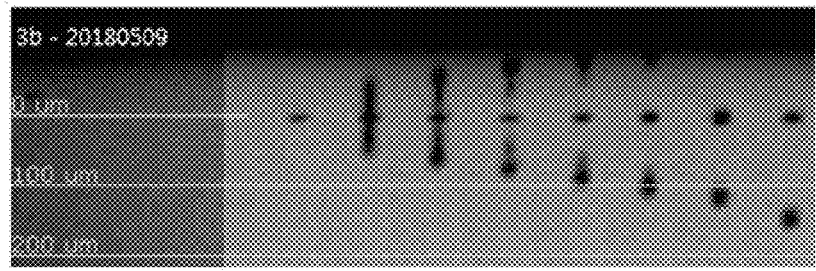
FIG. 11 illustrates results of observing droplet formation and droplet falling of dye inks 3b of Examples 5 to 8.
Figure 12:
FIG. 12 is an image showing a high-speed inkjet printer used to evaluate printing performance.

In particular, the prepared three scarlet inks were applied to a Dimatix inkjet printing device (10 pl head), and ink droplet formation was observed and injection stability thereof was evaluated. First, formation and falling of ink droplets were observed through a drop watcher. Droplet formation factors such as droplet tail length, droplet volume, droplet falling rate, and the like were observed, and ink behavior according to voltage and Hz was observed. As a result, it was confirmed that the inks 1b to 3b were optimized under conditions of 18 V and 2 kHz and thus stably ejected, and some of the results (the ink 3b) are illustrated in FIG. 11, while the inkjet printer that was used is illustrated in FIG. 12.

When droplet ejection conditions are not optimized, unstable droplets are formed, or satellite droplets are generated, and these factors are the main reasons for deteriorating the print quality in the inkjet process. When a satellite droplet is generated, the straightness of the droplet is lowered, and thus printing cannot be performed at a desired point on a substrate, and it is therefore absolutely required to stabilize droplets ejected from an inkjet head. To ensure the straightness of the ejected droplets, the head-driving voltage, driving waveform, and the physical and rheological properties of the ink must be controlled in order to maintain uniform ejection.

Figure 13:
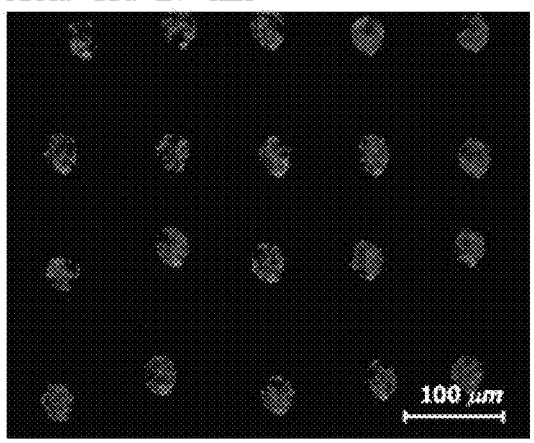
FIG. 13 illustrates results of observing the formation of inkjet-printed dot patterns of dye inks 3b of Examples 5 to 8 and acid red 27 dye as a control.
Figure 13:
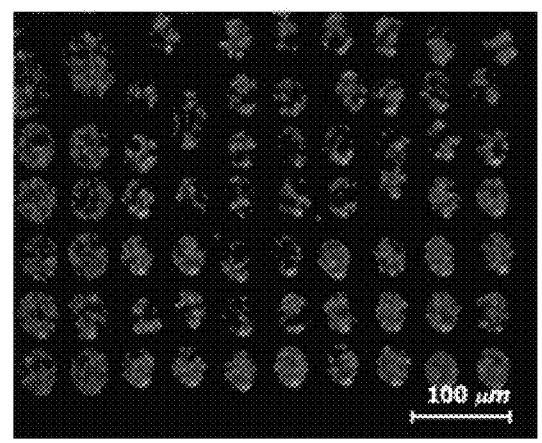
Figure 13:
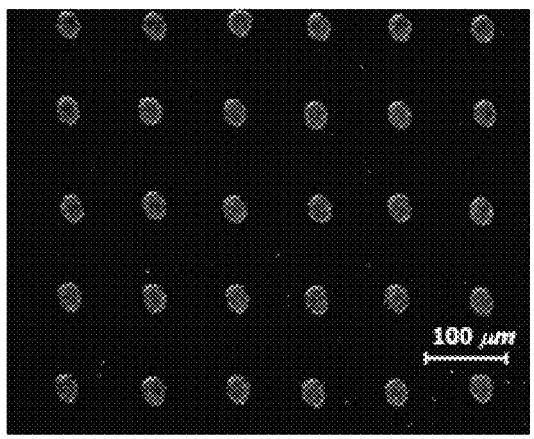
Figure 13:
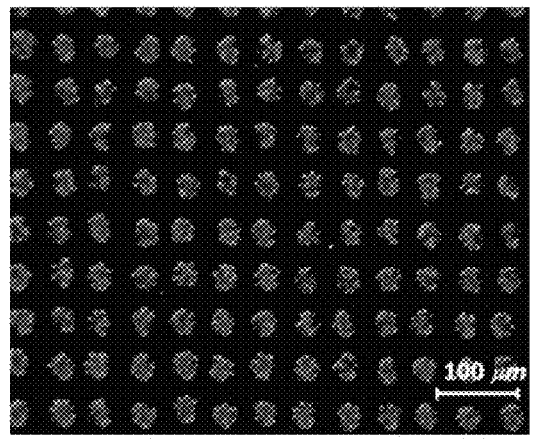

FIG. 13 shows inkjet-printed dot pattern formation at a droplet spacing of 100 μm and 50 μm of the control (acid red 27) ink and the ink 3b. In the case of the control (acid red 27) ink, accurate dot patterns were unable to be formed at a droplet spacing of 100 μm, and a similar pattern was shown at a droplet spacing of 50 μm, and some combined dot patterns were exhibited. This is because acid red 27, which is a control dye, has poorer water solubility than the synthesized perylene dyes (1b to 3b) and relatively reduced stability compared to that of the control (acid red 27) ink due to the use of a larger amount of dye with respect to the weight of the dye in the preparation of the ink in order to achieve similar maximum absorption. As a result, unstable droplets were formed during droplet ejection and the formed droplets had deteriorated straightness, and thus printing was unable to be performed at a desired position of a substrate.

In contrast, inkjet-printed dot patterns of the ink 3b at the droplet spacing of 100 μm and 50 μm were much more stable and well controlled. This is because the ink 3b was able to exhibit physical and rheological properties due to the high water solubility thereof. In addition, it is also helpful that the dye was used in a reduced amount with respect to the total weight of ink due to the high color intensity thereof, and a surface tension value according to selection of a surfactant significantly affected ink ejection.

Figure 14:
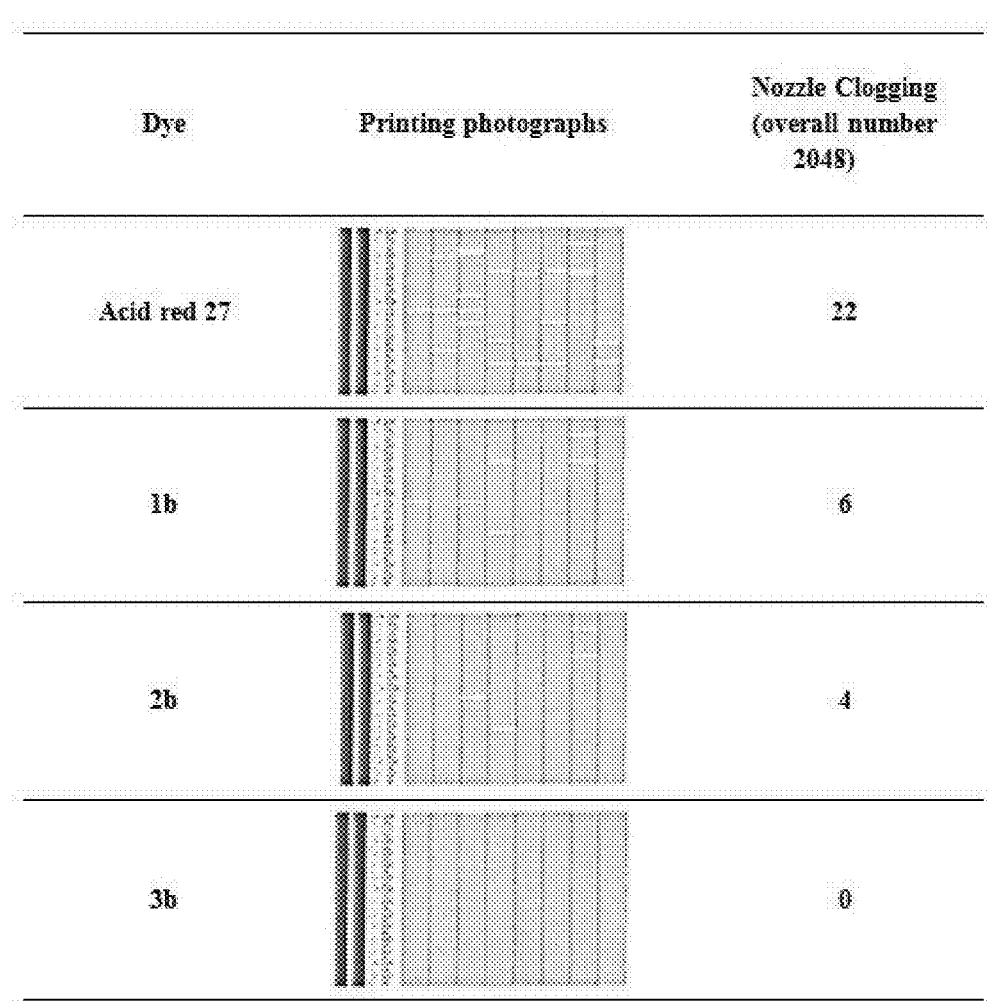
FIG. 14 illustrates results of measuring the number of clogged high-speed inkjet printer nozzles to confirm the ejection of large amounts of dye inks 1b to 3b of Examples 1 to 8 and acid red 27 dye ink as a control.

Lastly, to evaluate mass-formulated ink ejection, the number of clogged nozzles among 2,048 nozzles was measured using a test kit with a 600 dpi-grade KYOCERA head. As shown in FIG. 14, when the three prepared inks were used, a smaller number of nozzles was clogged compared to the case of the control (acid red 27) ink, from which it was confirmed that the inks exhibited excellent ejection properties. In particular, the case of the ink 3b having the highest solubility exhibited no nozzle clogging. The acid red 27 dye had deteriorated solubility compared to the synthesized dyes and was used in a larger amount with respect to the weight of the dye in the preparation of the ink in order to achieve a similar maximum absorption level, and thus the control dye exhibited relatively poor ink ejection.

As is apparent from the foregoing description, a highly saturated scarlet dye ink for a high-speed inkjet process of the present invention may be effective in developing a highly saturated scarlet color other than the basic color composition of existing digital textile printing (DTP) (yellow, magenta, light magenta, cyan, light cyan, light black, black, orange, blue, and red), and may address the disadvantages of DTP, which has limitations in developing pale/deep colors and highly saturated colors, as compared to analog-type textile printing in which dye mixing and application are relatively unrestricted.

Highly saturated deep-colored acidic dyes suitable for use in digital textile printing (DTP) require high water solubility, excellent color reproduction, high color developability, high ejection stability, and high fastness, and thus the inventors of the present invention selected perylene as a parent dye in accordance with these requirements.

However, perylene is generally used after being dissolved in an organic solvent due to the low water solubility thereof, and thus is limited in terms of applications thereof, and accordingly, the water solubility of perylene was improved through appropriate structural modification thereof.

In particular, the terminal position of perylene barely affects absorption wavelength regions, and thus an appropriate aryl group was introduced at the terminal of perylene through imidization, and this aryl group introduction reduced packing density, resulting in enhanced solubility.

In the present invention, bromine (Br) and chlorine (Cl), which are halogen elements, were introduced along with the aryl group to secure light fastness, and a sulfonic acid group ($SO_3H$) was introduced along with the aryl group in order to maximize water solubility.

Only a sulfonic acid group ($SO_3H$) is introduced at the bay position of perylene such that characteristic absorption at a wavelength of early 500 nm of parent perylene is no longer batho-shifted, thereby exhibiting a scarlet color and high water solubility.

The synthesized dyes of the present invention exhibited thermal stability below 400° C. and had a degradation temperature between about 400° C. and about 550° C., from which it was confirmed that the perylene-based dyes of the present invention had excellent heat resistance.

As a result of setting an absorbance value to 1 before light irradiation and measuring relative absorbance values over time, it was confirmed that the perylene-based dyes of the present invention had an absorbance of about 0.9 even after light irradiation was completed (after 1,200 minutes). In particular, when a halogen element was introduced into these dyes of the present invention, the dyes exhibited excellent light fastness, i.e., an absorbance of 0.95 or higher, as compared to existing dyes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A scarlet dye ink composition comprising:
about 3 wt % to about 10 wt % of a scarlet dye;
about 60 wt % to about 80 wt % of distilled water;
about 5 wt % to about 15 wt % of a surfactant; and
about 5 wt to about 25 wt % of an additive,
wherein the scarlet dye comprises a compound represented by Formula 1 below:

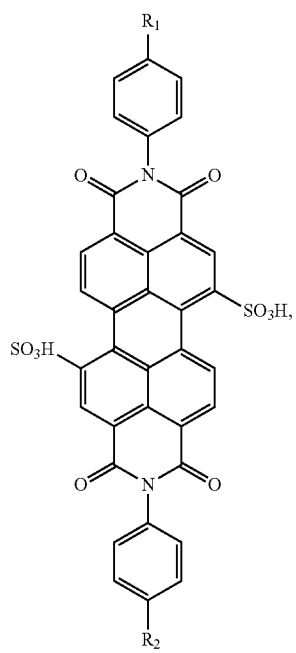

[Formula 1]

wherein, in Formula 1, $R_1$ is any one selected from the group consisting of Cl, Br, and $SO_3H$, and $R_2$ is any one selected from the group consisting of Cl, Br, and $SO_3H$.

2. A scarlet dye ink composition comprising:
a scarlet dye;
distilled water;
a surfactant; and
an additive,
wherein the scarlet dye comprises a compound represented by Formula 1 below:

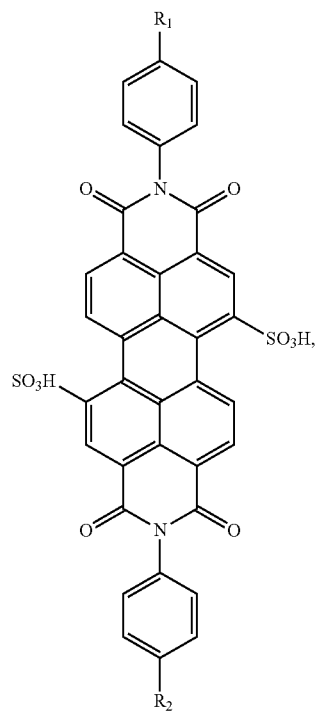

[Formula 1]

wherein, in Formula 1, $R_1$ is any one selected from the group consisting of Cl, Br, and $SO_3H$, and $R_2$ is any one selected from the group consisting of Cl, Br, and $SO_3H$, wherein the scarlet dye is purified using a method comprising:

dissolving the scarlet dye before desalination in a dispersion solvent;

filtering the resulting solution under reduced pressure;

precipitating the filtrate in an organic solvent;

filtering the precipitate under reduced pressure and drying the resulting precipitate in a vacuum oven; and removing free salt from the dried precipitate through a membrane filter.

3. A scarlet dye ink composition comprising:
a scarlet dye;
distilled water;
a surfactant; and
an additive, wherein the scarlet dye comprises a compound represented by Formula 1 below:

[Formula 1]

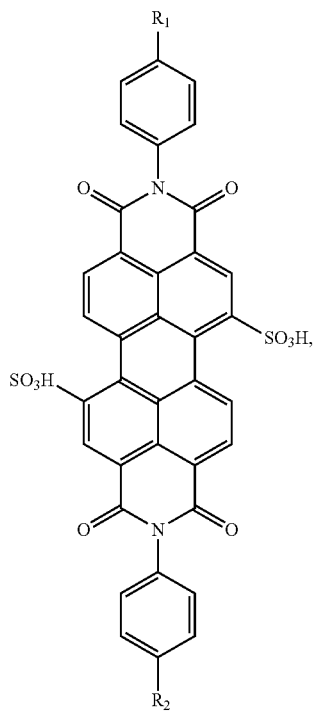

wherein, in Formula 1, $R_1$ is any one selected from the group consisting of Cl, Br, and $SO_3H$, and
$R_2$ is any one selected from the group consisting of Cl, Br, and $SO_3H$,
wherein the additive comprises one or more selected from the group consisting of alcohols, glycols, caprolactam, and glycerin.

4. A high-speed inkjet printer comprising the scarlet dye ink composition according to claim 1.

5. A digital textile printing (DTP) method using a scarlet dye ink composition and an inkjet printer, wherein the scarlet dye ink composition comprising:
a scarlet dye;
distilled water;
a surfactant; and
an additive,
wherein the scarlet dye comprises a compound represented by Formula 1 below:

[Formula 1]

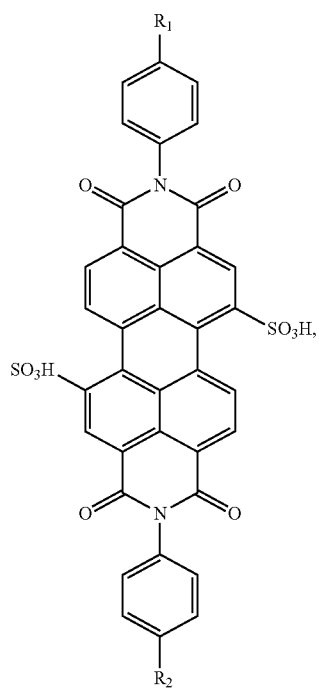

wherein, in Formula 1, $R_1$ is any one selected from the group consisting of Cl, Br, and $SO_3H$, and
$R_2$ is any one selected from the group consisting of Cl, Br, and $SO_3H$.

* * * * *